United States Patent
Hickman et al.

(10) Patent No.: US 9,287,700 B1
(45) Date of Patent: Mar. 15, 2016

(54) PROTECTION CIRCUIT

(71) Applicant: Alan Brandstaedter, Livingston, NJ (US)

(72) Inventors: Robert Hickman, Lebanon, NJ (US); Alan Brandstaedter, Livingston, NJ (US)

(73) Assignee: Anadigics, Inc., Warren, NJ (US)

( * ) Notice: Subject to any disclaimer, the term of this patent is extended or adjusted under 35 U.S.C. 154(b) by 198 days.

(21) Appl. No.: 13/910,802

(22) Filed: Jun. 5, 2013

(51) Int. Cl.
*H02H 9/04* (2006.01)

(52) U.S. Cl.
CPC ..................................... *H02H 9/044* (2013.01)

(58) Field of Classification Search
CPC ....... H01L 27/0259; H02H 9/04; H02H 9/046
USPC ........................................................... 361/56
See application file for complete search history.

(56) References Cited

U.S. PATENT DOCUMENTS 5,212,618 A * 5/1993 O'Neill et al. ................... 361/56
5,602,409 A * 2/1997 Olney ............................ 257/362

* cited by examiner

*Primary Examiner* — Thienvu Tran
*Assistant Examiner* — Kevin J Comber
(74) *Attorney, Agent, or Firm* — Kelley Drye & Warren LLP (57) ABSTRACT

A protection circuit for an electronic circuit. The protection circuit includes a first transistor, a second transistor, a base current path, and a current discharge path. The first transistor is connected to a first terminal of the electronic circuit. The second transistor is connected to a second terminal of the electronic circuit. The first transistor is connected to the second transistor forming the base current path. The current discharge path conducts a discharge current from the first terminal to the second terminal through the second transistor when the second transistor is turned on with a base current in the base current path.

18 Claims, 11 Drawing Sheets

PROTECTION CIRCUIT

TECHNICAL FIELD

The present invention generally relates to field of protection circuits for electronic circuits. More specifically, the present invention relates to Electrostatic discharge (ESD) protection circuits for electronic circuits.

BACKGROUND OF THE INVENTION

Electrostatic discharge (ESD) events may cause substantial damage to integrated circuits (ICs) and/or electrical circuits. Hence, protection circuits or devices are connected to the ICs and/or electrical circuits to protect the circuits from the damage caused by the ESD events. With the protection circuits or devices, the damage caused to the ICs and/or electrical circuits is reduced by dissipating the charge caused by the ESD events through the protection circuits or devices.

However, with the complexities involved in today's ICs and/or electrical circuits, the existing protection circuit or device designs are not adequate to avoid interference with the normal operation of the ICs or electrical circuits. Also, any enhancement in the existing protection circuits or devices adds a substantial cost to the ICs or electrical circuits. Furthermore, various state of the art enhancements in the existing protection circuits or devices do not address the design constraints, such as size and shape.

SUMMARY OF THE INVENTION

According to embodiments illustrated herein, there is provided a protection circuit for an electronic circuit. The protection circuit includes a first transistor and a second transistor. The emitter terminal of the first transistor is connected to a first terminal of the electronic circuit. The emitter terminal of the second transistor is connected to a second terminal of the electronic circuit. The collector terminal of the first transistor is connected to the collector terminal of the second transistor. The base terminal of the first transistor is connected to the base terminal of the second transistor and forms a base current path.

The protection circuit further includes one or more diodes in the base current path or connected to the base current path to increase a turn-on voltage of the protection circuit. Furthermore, the protection circuit includes a first diode and a second diode in a current discharge path, wherein the collector terminal of the first transistor is connected to the cathode terminal of the second diode, the collector terminal of the second transistor is connected to the cathode terminal of the first diode, and the anode terminal of the first diode is connected to the first terminal.

The base current path conducts a base current from the base terminal of the first transistor to the base terminal of the second transistor when a voltage at the emitter terminal of the first transistor exceeds the reverse breakdown voltage of the base emitter junction of the first transistor plus the forward turn-on voltage of the base emitter junction of the second transistor. The current discharge path conducts a discharge current from the first terminal to the second terminal through the second transistor when the second transistor is turned on with the base current. The current discharge path conducts a reverse discharge current from the second terminal to the first terminal through the first transistor when the first transistor is turned on with the base current.

The first transistor and the second transistor both function either as a trigger to turn-on the protection circuit or as a discharge switch to dissipate the electrostatic discharge current of the electronic circuit depending on the direction of the current flow between the first terminal and the second terminal.

BRIEF DESCRIPTION OF THE DRAWINGS

The detailed description of the embodiments of the invention will hereinafter be described in conjunction with the appended drawings provided to illustrate and not to limit the invention, wherein like designations denote like elements, and in which.

DESCRIPTION OF THE PREFERRED EMBODIMENTS

The invention can be best understood with reference to the detailed figures and description set forth herein. Various embodiments are discussed below with reference to the figures. However, it will be apparent to a person having ordinary skill in the art that the detailed description given herein with respect to these figures is just for explanatory purposes. The disclosed circuits extend beyond the described embodiments. For example, it will be apparent to a person having ordinary skill in the art that in light of the teachings presented, multiple alternate and suitable approaches may be realized, to implement the functionality of any detail described herein, beyond the particular implementation choices in the following embodiments described and shown.

Figure 1:
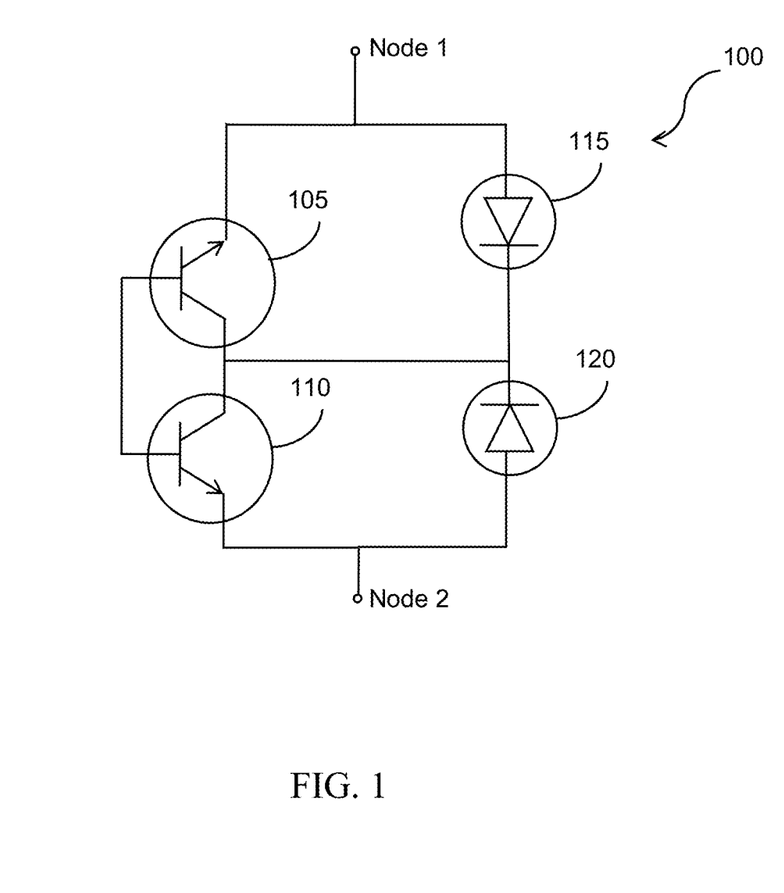
FIG. 1 illustrates a protection circuit for an electronic circuit in accordance with an embodiment of the invention.

FIG. 1 illustrates a protection circuit 100 for an electronic circuit in accordance with an embodiment of the invention. The protection circuit 100 includes a first transistor 105 and a second transistor 110 connected to a first terminal and a second terminal of the electronic circuit (not shown) at a Node 1 and a Node 2, respectively. In an embodiment, the second terminal of the electronic circuit is a ground terminal, for a discharge current to be grounded when the high voltage appears at the Node 1 (refer to FIG. 2). The emitter terminal of first transistor 105 is connected to the Node 1. The emitter terminal of second transistor 110 is connected to the Node 2. The base terminal of first transistor 105 is connected to the base terminal of second transistor 110 forming a base current path. The collector terminal of first transistor 105 is connected to collector terminal of second transistor 110.

The protection circuit 100 further includes a first diode 115 and a second diode 120, which are connected to first transistor 105 and second transistor 110, respectively. The collector terminal of first transistor 105, the collector terminal of the second transistor 110, the cathode terminal of first diode 115, and the cathode terminal of second diode 120 are connected together to form a common collector area 410 or 510 which are discussed under FIG. 4 and FIG. 5 respectively.

Protection circuit 100 is in OFF state when an absolute voltage difference between the Node 1 and the Node 2 is less than a turn-on voltage $V_{ON}$ between the Node 1 and Node 2. The turn-on voltage $V_{ON}$ between the Node 1 and Node 2 is the reverse breakdown voltage of the base emitter junction of first transistor 105 plus the forward turn-on voltage of the base emitter junction of second transistor 110. For example, the turn-on voltage $V_{ON}$ between the Node 1 and Node 2 or vice versa is 7V.

First diode 115 and second diode 120 block the charge flow in one direction and pass the charge flow in the opposite direction. During the OFF state, first diode 115 and second diode 120 reduce parasitic capacitance in protection circuit 100. In an embodiment, the reduction in the parasitic capacitance ranges between 0.15 picofarad (pF) to 0.5 pF. During the OFF state protection circuit 100 has a high direct current DC impedance of 10 megaohms (MΩ) or higher thus allowing very low parasitic leakage current flow between the Node 1 and the Node 2.

Figure 2:
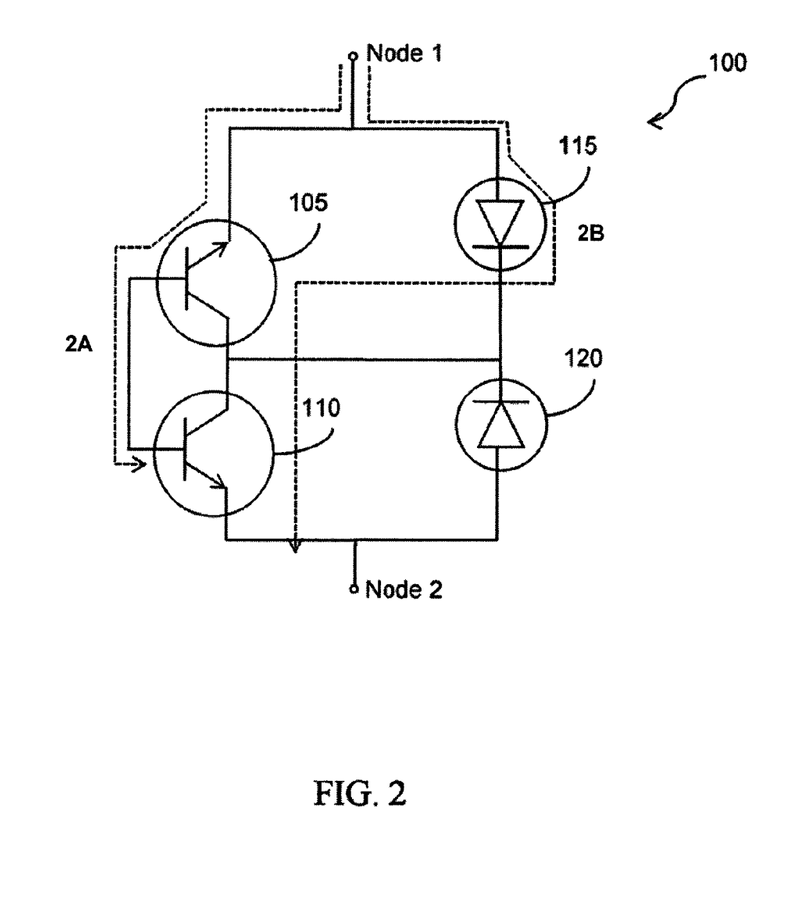
FIG. 2 illustrates current flows in a protection circuit in accordance with an embodiment of the invention.
Figure 3:
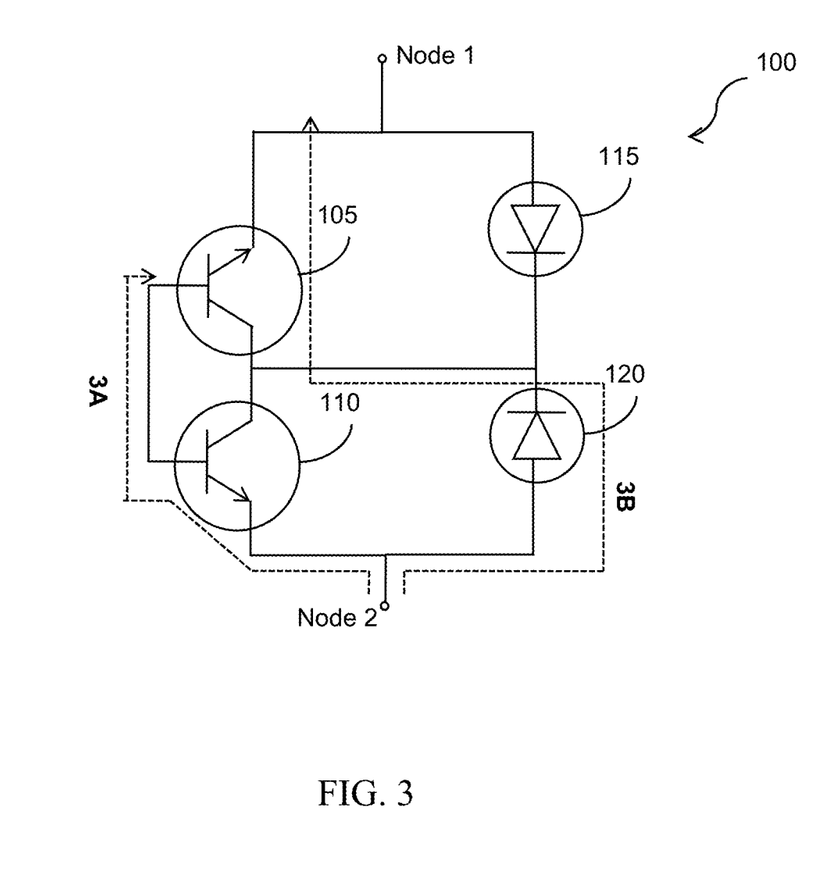
FIG. 3 illustrates current flows in a protection circuit in accordance with an embodiment of the invention.

Protection circuit 100 is in ON state when the absolute voltage difference between the Node 1 and the Node 2 is greater than the turn-on voltage $V_{ON}$ between the Node 1 and Node 2. In ON state, protection circuit 100 conducts a discharge current. FIG. 2 and FIG. 3 illustrate flow of discharge current in accordance with various embodiments.

FIG. 2 illustrates current flows in protection circuit 100 in accordance with an embodiment of the invention.

In operation, an ESD event occurs in the electronic circuit, when the absolute voltage difference between the Node 1 and the Node 2 is greater than the turn-on voltage $V_{ON}$. Thus, if the voltage at the Node 1 is greater than the voltage at the Node 2 by the turn-on voltage $V_{ON}$, first transistor 105 operates in the cut-off region. First transistor 105 acts as a trigger causing protection circuit 100 to be turned ON. In this situation, a trigger current 2A flows from the emitter terminal of first transistor 105 to the base terminal of second transistor 110. First transistor 105 operates in the cut-off region and the trigger current 2A flowing across the emitter terminal of first transistor 105 causes first transistor 105 to reach a state of reverse breakdown. During the state of reverse breakdown, the trigger current 2A at the base-emitter junction of first transistor 105 is blocked from flowing across the base-collector junction of first transistor 105, by second diode 120, which is in reverse bias. Hence the trigger current 2A from the base-emitter junction of first transistor 105 flows only to the base terminal of second transistor 110 in the base current path. The trigger current 2A at the base terminal of second transistor 110 forward biases the base-emitter junction of second transistor 110, causing second transistor 110 to turn-on. At this stage, a discharge current 2B flows from first diode 115, which is in forward bias, to the Node 2 through second transistor 110, when second transistor 110 is turned ON by the trigger current 2A. The discharge current 2B is greater than the trigger current 2A (it is understood that a low base current, as compared to the current flowing through first diode 115, is sufficient to turn-on second transistor 110), and this discharge current 2B is dissipated at the Node 2 through the emitter terminal of second transistor 110.

FIG. 3 illustrates current flows in protection circuit 100 in accordance with an embodiment of the invention.

If there is a dip in the voltage at the Node 1 such that absolute voltage difference between the Node 1 and the Node 2 is greater than the turn-on voltage $V_{ON}$, second transistor 110 operates in the cut-off region. Similarly, when the voltage at the Node 2 rises such that absolute voltage difference from the Node 2 to the Node 1 is greater than the turn-on voltage $V_{ON}$, second transistor 110 operates in the cut-off region. In both the cases, second transistor 110 acts as a trigger causing protection circuit 100 to be turned ON. In this situation, a trigger current 3A flows from the emitter terminal of second transistor 110 to the base terminal of first transistor 105. Second transistor 110 operates in the cut-off region and the trigger current 3A flowing across the emitter terminal of second transistor 110 causes second transistor 110 to reach a state of reverse breakdown. During the state of reverse breakdown, the trigger current 3A at the base-emitter junction of second transistor 110 is blocked from flowing across the base-collector junction of second transistor 110, by first diode 115, which is in reverse bias. Hence the trigger current 3A from the base-emitter junction of second transistor 110 flows only to the base terminal of first transistor 110 in the base current path. The trigger current 3A at the base terminal of first transistor 105 forward biases the base-emitter junction of first transistor 105 causing first transistor 105 to turn-on. At this stage, a reverse discharge current 3B flows from second diode 120, which is in forward bias, to the Node 1 through first transistor 105, which is turned ON by the trigger current 3A. The reverse discharge current 3B is greater than the trigger current 3A (it is understood that a low base current, as compared to the current flowing through second diode 120, is sufficient to turn-on first transistor 105), and this reverse discharge current 3B is dissipated at the Node 1 through the emitter terminal of first transistor 105.

Figure 4:
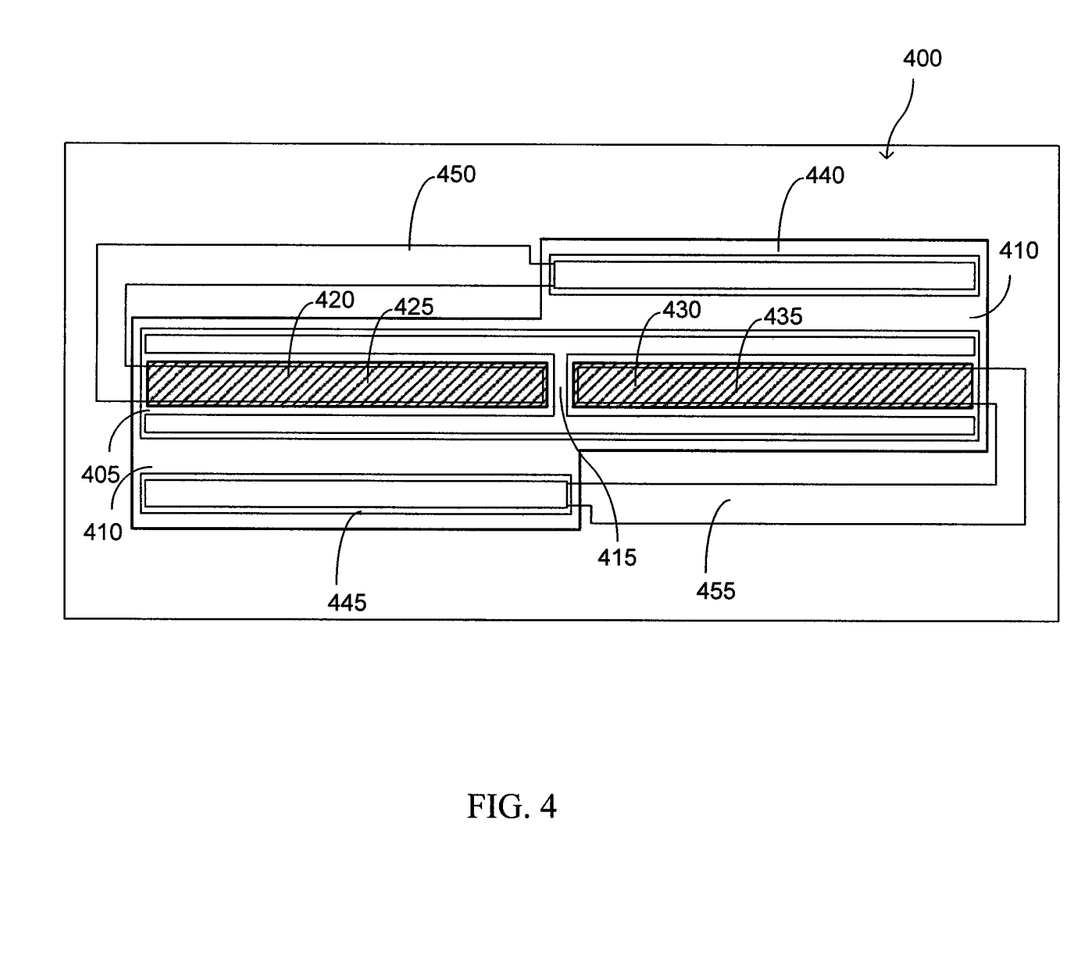
FIG. 4 illustrates an integrated circuit in accordance with an embodiment of the invention.

FIG. 4 illustrates an integrated circuit 400 in accordance with an embodiment of the invention. The base terminal of first transistor 105 and the base terminal of second transistor 110 are integrated to form a common base area, which is depicted as 405. The collector terminal of first transistor 105, the collector terminal of second transistor 110, the cathode terminal of first diode 115, and the cathode terminal of second diode 120 are connected to form the common collector area, which is depicted as 410. The metal contact of the base terminals of first transistor 105 and second transistor 110 is depicted as 415. The emitter terminal of first transistor 105 is depicted as 420. The metal contact of the emitter terminal of first transistor 105 is depicted as 425. The emitter terminal of second transistor 110 is depicted as 430. The metal contact of the emitter terminal of second transistor 110 is depicted as 435.

First diode 115 is formed by the base region depicted as 440 and the common collector area 410. Second diode 120 is formed by the base region depicted as 445 and the common collector area 410. In an embodiment, the illustrated integrated circuit 400 of protection circuit 100 does not include a collector contact. The electrical charge from the collector terminals of first transistor 105 and second transistor 110, and the cathode terminals of first diode 115 and second diode 120 flows through the common collector area 410. The metal contact of the emitter terminal of first transistor 105 and the anode terminal of first diode 115 is depicted as 450 which is the terminal of protection circuit 100 connected to the Node 1. The metal contact of the emitter terminal of second transistor 110 and the anode terminal of second diode 120 is depicted as 455, which is the terminal of protection circuit 100 connected to the Node 2.

For example, protection circuit 100 may be fabricated as bipolar transistor integrated circuit using semiconductor materials, which may include, but are not limited to, silicon, silicon germanium, silicon carbide, gallium nitride, aluminum gallium nitride, indium nitride, gallium arsenide, aluminum gallium arsenide, indium gallium arsenide phosphide, indium phosphide, aluminum indium phosphide, indium gallium arsenide, gallium arsenide antimonide, and the like.

Figure 5:
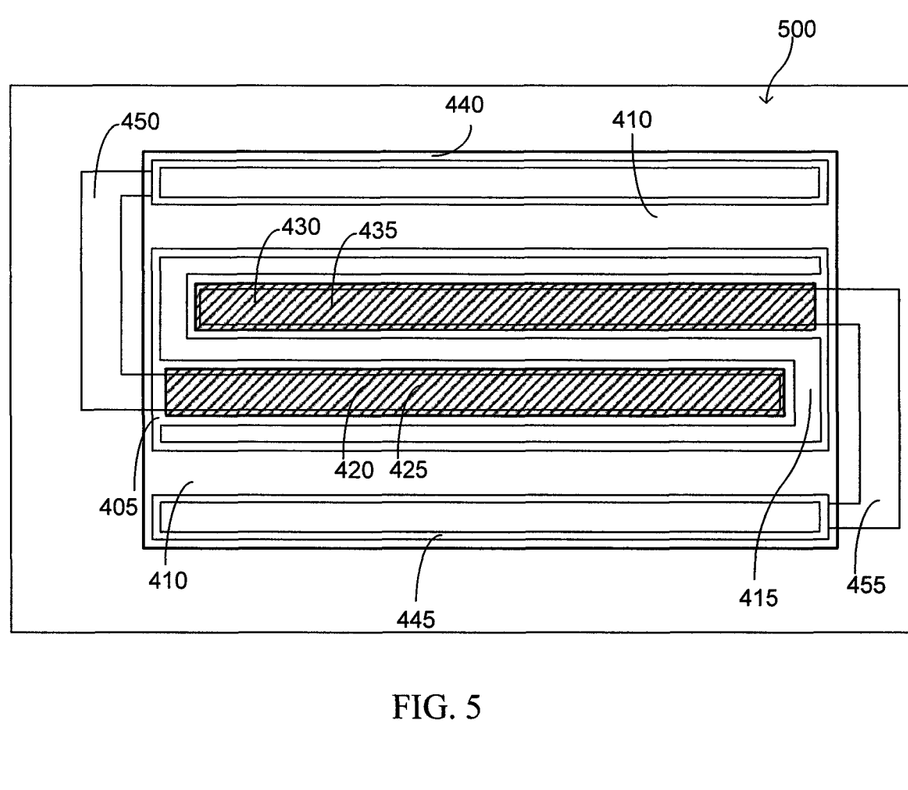
FIG. 5 illustrates an integrated circuit having an alternate layout in accordance with another embodiment of the invention.

FIG. 5 illustrates an integrated circuit 500 having an alternate layout in accordance with another embodiment of the invention. The elements referenced with the same numbers in FIG. 5 as that of integrated circuit 400 are connected in a similar fashion as that explained in FIG. 4. In operation FIG. 5 performs the same functions and produces the same ESD protection circuit function as described in FIG. 4. In this alternate layout, sections (430, 435) and 440 are vertically aligned with sections (420, 425) and 445 as compared to the side-by-side arrangement of FIG. 4. Thus, the shape of the metal contact 415 is different than that of integrated circuit 400.

Integrated circuit 500 may be fabricated using discrete integrated circuit bipolar and diode devices instead of using the integrated base, base contacts, and the collector-cathode contacts. It will be apparent to a person having ordinary skill in the art that integrated circuits 400 or 500 may use differing fabrication techniques to form the discussed protection circuit 100.

Figure 6:
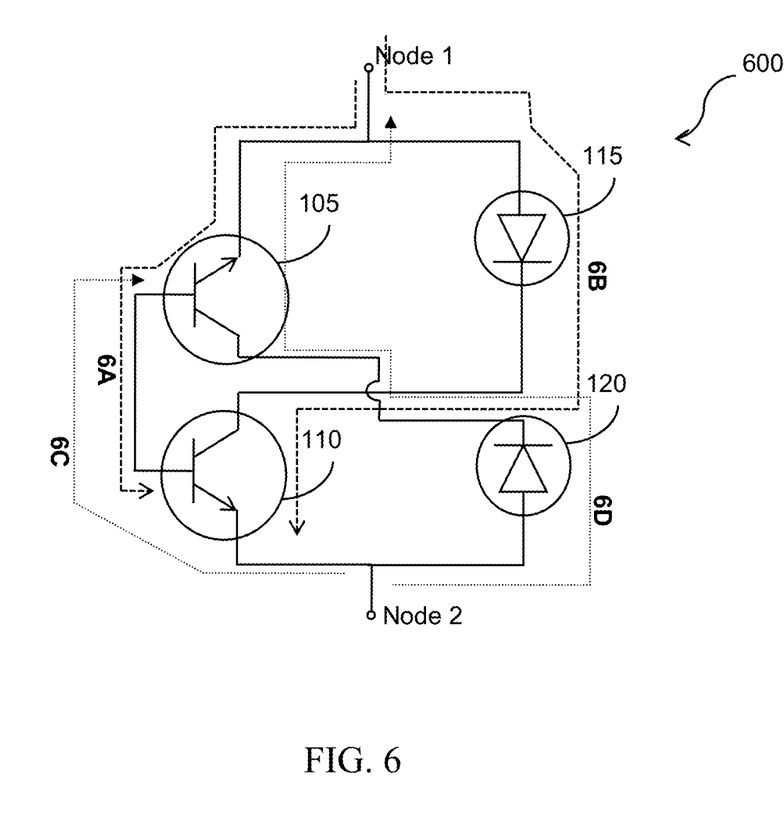
FIG. 6 illustrates a protection circuit for an electronic circuit in accordance with an embodiment of the invention.

FIG. 6 illustrates a protection circuit 600 for an electronic circuit in accordance with an embodiment of the invention. The elements referenced with same the numbers in FIG. 6 as that of protection circuit 100 and are connected in the similar fashion as explained in FIG. 1, except for the connections in the common collector area 410 or 510.

The common collector area 410 or 510 is absent in protection circuit 600. The collector terminal of first transistor 105 is only connected to the cathode terminal of second diode 120. The collector terminal of the second transistor 110 is only connected to the cathode terminal of first diode 120.

When the voltage at the Node 1 is greater than the Node 2, by the turn-on voltage $V_{ON}$, a trigger current 6A (shown with a dashed line) across the base-emitter junction of first transistor 105 is blocked from flowing across the base-collector junction of first transistor 105 due to second diode 120 (which is in reverse bias), and the trigger current 6A from the base-emitter junction of first transistor 105 flows only to the base terminal of second transistor 110. At this stage, a reverse discharge current 6B (shown with a dashed line) flows from first diode 115, which is in forward bias, to the Node 2 through second transistor 110, which is turned ON by the trigger current 6A.

When the absolute voltage at the Node 2 is greater than the Node 1, by the turn-on voltage $V_{ON}$, a trigger current 6C (shown with a dotted line) across the base-emitter junction of second transistor 110 is blocked from flowing across the base-collector junction of second transistor 110 due to first diode 115 (which is in reverse bias), and the trigger current 6C from the base-emitter junction of second transistor 110 flows only to the base terminal of first transistor 105. At this stage, the reverse discharge current 6D (shown with a dotted line) flows from second diode 120, which is in forward bias, to the Node 1 through first transistor 105, which is turned ON by the trigger current 6C. The electronic components (such as, first transistor 105, second transistor 110, first diode 115, and second diode 120) in protection circuit 600 are connected discretely, as per the turn-on voltage $V_{ON}$ and/or size requirements. In an embodiment, for example, the turn-on voltage $V_{ON}$ from the Node 1 to the Node 2 is 7V.

Figure 7:
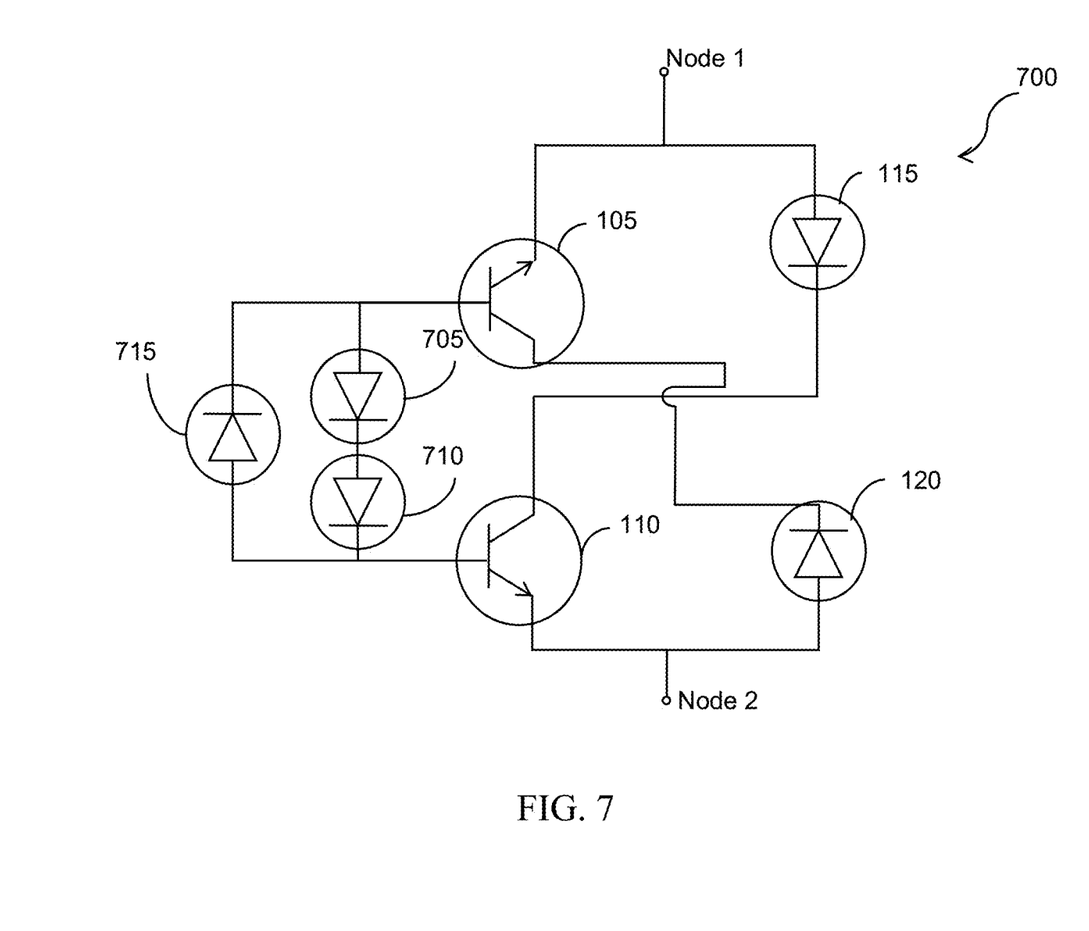
FIG. 7 illustrates a protection circuit for an electronic circuit in accordance with another embodiment of the invention.

FIG. 7 illustrates a protection circuit 700 for an electronic circuit in accordance with another embodiment of the invention. The elements referenced with the same numbers in FIG. 7 as that of protection circuit 600 and are connected in the similar fashion as explained in FIG. 6. In addition, three diodes (705, 710, and 715) are connected to the base current path.

Diodes 705 and 710 are in forward bias and diode 715 is in reverse bias when the Node 1 has the higher positive charge as compared to the Node 2. Diodes 705 and 710 are connected in series and diode 715 is connected in parallel to the path of diodes 705 and 710. The anode terminal of diode 705 is connected to the base terminal of first transistor 105 and the cathode terminal is connected to the anode terminal of diode 710. The cathode terminal of diode 710 is connected to the base terminal of second transistor 110. The anode terminal of diode 715 is connected to the base terminal of second transistor 110 and the cathode terminal is connected to the base terminal of first transistor 105.

In FIG. 7, the turn-on voltage $V_{ON}$ of the Node 1 to the Node 2 is the reverse breakdown voltage of the base-emitter junction of first transistor 105 plus the base-emitter turn-on voltage of second transistor 110 plus the turn-on voltages of diodes 705 and 710. Thus the turn-on voltage $V_{ON}$ in FIG. 7 is increased from the turn-on voltage $V_{ON}$ in FIG. 6 by the turn-on voltages of diodes 705 and 710. Diode 715 blocks only the current flowing through the parallel path and does not influence the magnitude of the turn-on voltage $V_{ON}$ set from the Node 1 to the Node 2. In an embodiment, for example, by using diodes 705 and 710, the turn-on voltage $V_{ON}$ from the Node 1 to the Node 2 is increased from 7V to 8.4V (if diodes 705 and 710 are fabricated using silicon) to allow a higher discharge current to be dissipated from the Node 1 to Node 2 in protection circuit 700 as compared to protection circuit 600.

When the Node 2 has the higher positive charge as compared to the Node 1 diode 715 is in forward bias and diodes 705 and 710 are in reverse bias. The turn-on voltage $V_{ON}$ of the Node 2 to the Node 1 is the reverse breakdown voltage of the base-emitter junction of second transistor 110 plus the base-emitter turn-on voltage of first transistor 105 plus the turn-on voltage of diode 715. Diodes 705 and 710 block only the current flowing through the parallel path and does not influence the magnitude of the turn-on voltage $V_{ON}$ set from the Node 2 to the Node 1. In an embodiment, for example, by using diode 715, the turn-on voltage $V_{ON}$ is increased from 7V to 7.7V (if diode 715 is fabricated using silicon) to allow a higher discharge current to be dissipated from the Node 2 to Node 1 in protection circuit 700 as compared to protection circuit 600.

Figure 8:
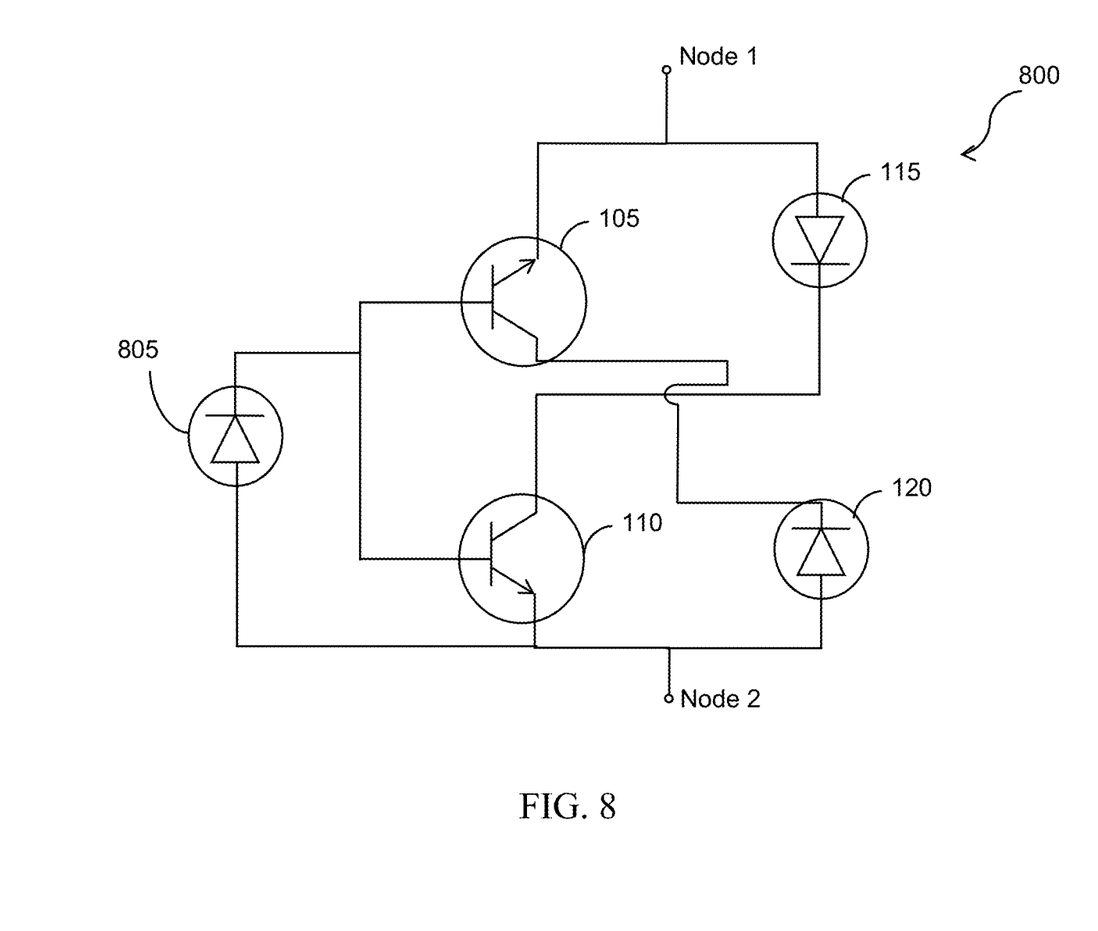
FIG. 8 illustrates a protection circuit for an electronic circuit in accordance with another embodiment of the invention.

FIG. 8 illustrates a protection circuit 800 for an electronic circuit in accordance with another embodiment of the invention. The elements referenced with the same numbers in FIG. 8 as that of protection circuit 600 and are connected in the similar fashion as explained in FIG. 6. In addition, a diode 805 is connected between the Node 2 and the base current path to reduce the turn-on voltage $V_{ON}$ from the Node 2 to the Node 1.

In an embodiment, when the turn-on voltage $V_{ON}$ is to be reduced from the Node 2 to the Node 1, diode 805 is connected in forward bias from the Node 2 to Node 1. The cathode terminal of diode 805 is connected to the base terminal of first transistor 105 in the base current path and the anode terminal of diode 805 is connected to the Node 2. In this case, the turn-on voltage $V_{ON}$ from Node 2 to Node 1 is the turn-on voltage of 805 plus the base-emitter turn-on voltage of first transistor 105. The turn-on voltage of 805 is lower than the reverse breakdown voltage of the base-emitter junction of second transistor 110, thus lowering the turn-on voltage $V_{ON}$ from Node 2 to Node 1. For a person having ordinary skill in the art, it will be apparent that diode 805 can also be appropriately connected to reduce the turn-on voltage $V_{ON}$ from the Node 1 to Node 2.

Figure 9:
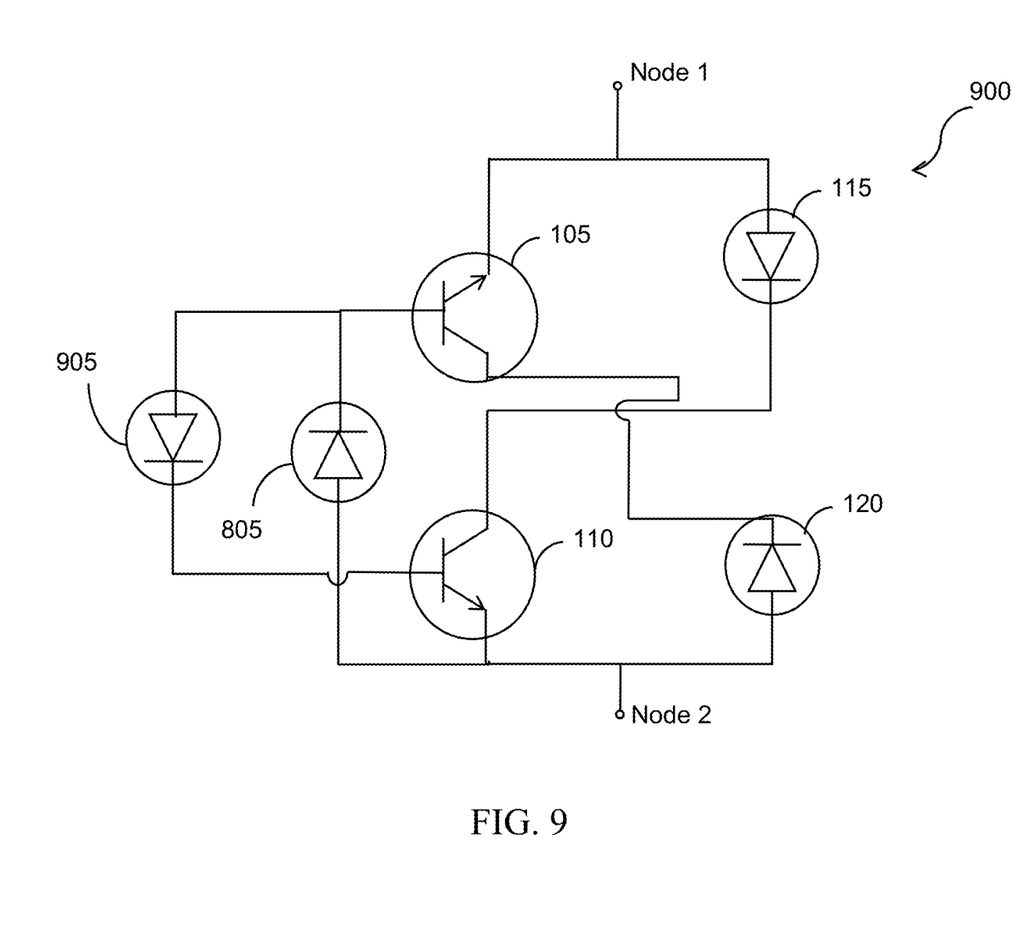
FIG. 9 illustrates a protection circuit for an electronic circuit in accordance with yet another embodiment of the invention.

FIG. 9 illustrates a protection circuit 900 for an electronic circuit in accordance with yet another embodiment of the invention. The elements referenced with the same numbers in FIG. 9 as that of protection circuit 600 and are connected in the similar fashion as explained in FIG. 6. In addition, a diode 905 is connected to the base current path where the anode terminal of the diode 905 is connected to base terminal of first transistor 105 and the cathode terminal is connected to the base terminal of second transistor 110. The diode 905 increases the turn-on voltage $V_{ON}$ from the Node 1 to the Node 2. Also the diode 805 is connected between the Node 2 and the base current path to reduce the turn-on voltage from the Node 2 to the Node 1.

To a person having ordinary skill in the art, it will be apparent that alternative implementations can be combined to create protection circuits and devices with the properties of an increased $V_{ON}$ from the Node 1 to the Node 2 and a decreased $V_{ON}$ from the Node 2 to the Node 1, or an increased $V_{ON}$ from the Node 2 to the Node 1 and a decreased $V_{ON}$ from the Node 1 to the Node 2, as illustrated in FIG. 9.

Figure 10:
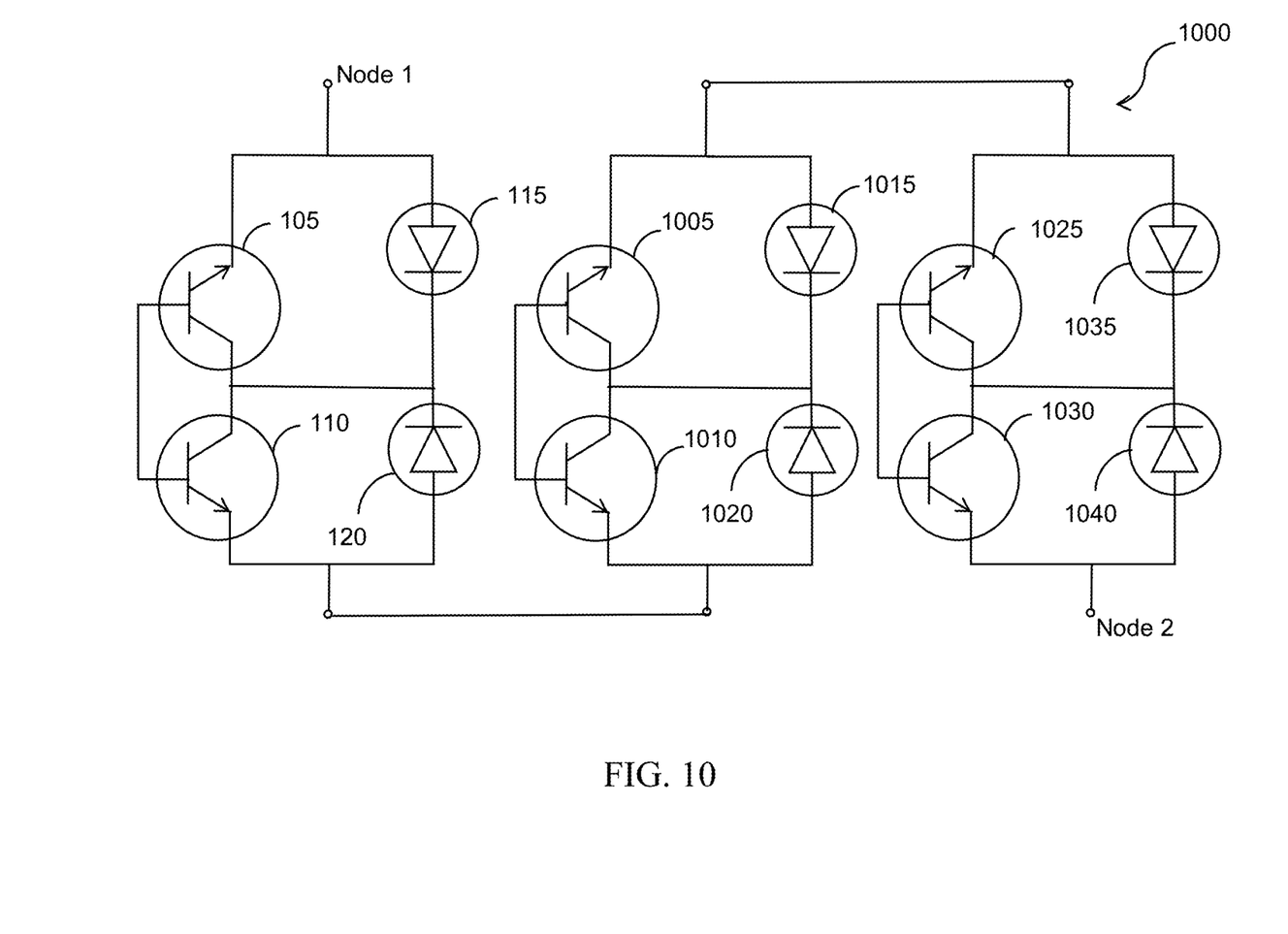
FIG. 10 illustrates a protection circuit for an electronic circuit in accordance with still another embodiment of the invention.

FIG. 10 illustrates a protection circuit 1000 for an electronic circuit in accordance with still another embodiment of the invention. More than one protection circuits 100 can be connected in series between the Node 1 and Node 2 to increase or change the value of $V_{ON}$ and form protection circuit 1000, as demonstrated in FIG. 10.

Figure 11:
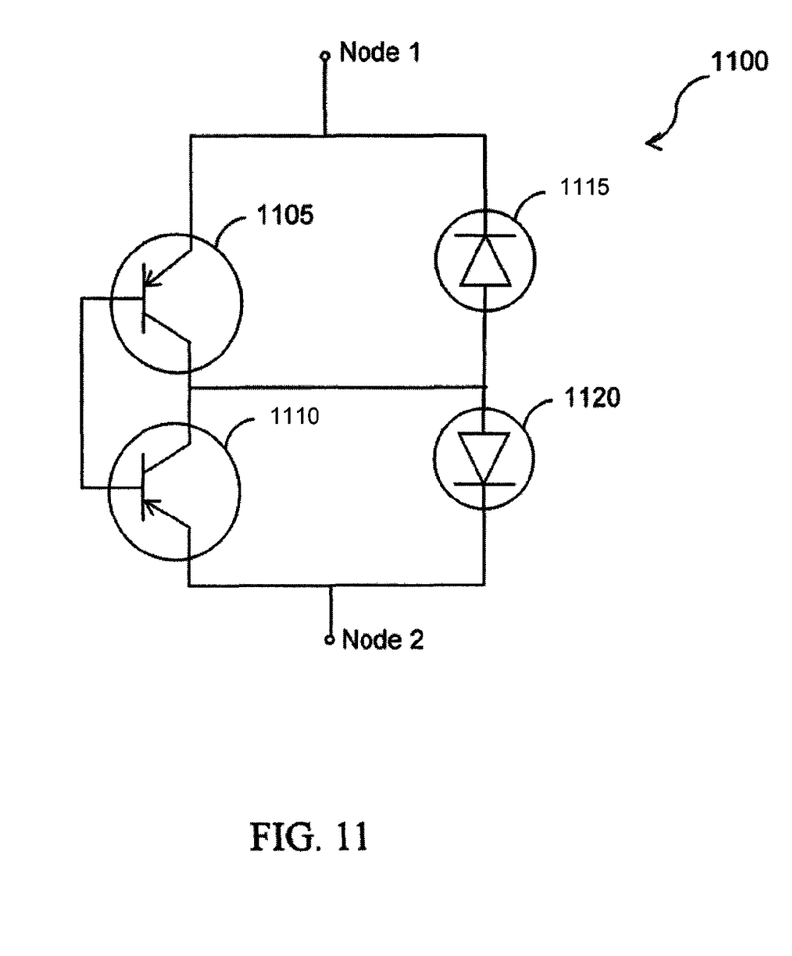
FIG. 11 illustrates a protection circuit for an electronic circuit in accordance with an embodiment of the invention.

FIG. 11 illustrates a protection circuit 1100 for an electronic circuit in accordance with an additional embodiment of the invention. The circuit in FIG. 1 can be modified to use PNP transistors as demonstrated in FIG. 11. The emitter terminal of first transistor 105 is connected to the Node 1. The emitter terminal of second transistor 110 is connected to the Node 2. The base terminal of first transistor 105 is connected to the base terminal of second transistor 110 forming a base current path. The collector terminal of first transistor 105 is connected to collector terminal of second transistor 110. The collector terminal of first transistor 105, the collector terminal of the second transistor 110, the cathode terminal of first diode 115, and the cathode terminal of second diode 120 are connected together to form the common collector area 410 or 510 as discussed under FIG. 4 and FIG. 5 respectively.

The embodiments of the invention provide significant advantages. Integrated circuits and/or electrical circuits are protected from the damage caused by ESD by connecting the circuits to protection circuits as discussed in various embodiments. The protection circuits of the present invention do not interfere with the normal operation of the integrated circuit or electrical circuits. With the usage of minimal electronic components in protection circuits the cost involved in dissipating the ESD is reduced. The protection circuits of the present invention also provide protection against human and machine ESD. Further, the protection circuits achieve very low leakage currents and very low capacitance when the circuit is in OFF state. The design of protection circuits (as explained in FIGS. 4 and 5) forms a compact geometry with reduced size. The protection circuits as per various embodiments allow flexibility in affecting the change of the turn-on voltages $V_{ON}$ at which charge dissipation occurs in a bi-directional manner between the Node 1 and Node 2.

While various embodiments of the present invention have been illustrated and described, it will be clear that the electronic components of the protection circuit 100 can be fabricated as a single integrated circuit (as shown in FIG. 4 and FIG. 5), or as discrete circuit components connected together. Further, various other possible combinations of the electronic components may also be used without departing from the scope of the invention.

While various embodiments have been illustrated and described, it will be clear that the invention is not limited to these embodiments only. For a person having ordinary skill in the art, it will be apparent that numerous modifications, changes, variations, substitutions, and equivalents can be used without departing from the scope and spirit of the invention, as described in the claims that follow.

What is claimed is:

1. A protection circuit for an electronic circuit, the protection circuit comprising:
    a first transistor, the emitter terminal of the first transistor being connected to a first terminal of the electronic circuit;
    a second transistor, the emitter terminal of the second transistor being connected to a second terminal of the electronic circuit;
    a base current path for conducting a base current from the base terminal of the first transistor to the base terminal of the second transistor when a voltage at the emitter terminal of the first transistor exceeds the reverse breakdown voltage of the base emitter junction of the first transistor plus the forward turn-on voltage of the base emitter junction of the second transistor;
    a current discharge path for conducting a discharge current from the first terminal to the second terminal through the second transistor when the second transistor is turned on with the base current; and
    one or more diodes in the base current path or connected to the base current path.

2. The protection circuit according to claim 1, wherein the one or more diodes in the base current path are connected in series.

3. The protection circuit according to claim 1, wherein the one or more diodes in the base current path are connected in parallel.

4. The protection circuit according to claim 1, wherein the discharge current flows from the first terminal to the second terminal when the voltage at the emitter terminal of the first transistor exceeds the reverse breakdown voltage of the base emitter junction of the first transistor plus the forward turn-on voltage of the base emitter junction of the second transistor plus a sum of turn-on voltages of the one or more diodes.

5. The protection circuit according to claim 1, wherein the collector terminal of the first transistor is connected to the collector terminal of the second transistor.

6. The protection circuit according to claim 1, wherein:
    the collector terminal of the first transistor is connected to the cathode terminal of a second diode;
    the collector terminal of the second transistor is connected to the cathode terminal of a first diode; and
    the anode terminal of the first diode is connected to the first terminal.

7. The protection circuit according to claim 6, wherein the discharge current flows through the first diode and the second transistor when the second transistor is turned on.

8. The protection circuit according to claim 6, wherein a reverse discharge current flows through the second diode and the first transistor when the first transistor is turned on.

9. The protection circuit according to claim 6, wherein the cathode terminal of the second diode, the cathode terminal of the first diode, the collector terminal of the second transistor, and the collector terminal of the first transistor are connected to form a common collector area.

10. The protection circuit according to claim 1, wherein the base terminal of the first transistor and the base terminal of the second transistor are connected to form a common base area.

11. A protection circuit for an electronic circuit, the protection circuit comprising:
- a first transistor, the emitter terminal of the first transistor being connected to a first terminal of the electronic circuit;
- a second transistor, the emitter terminal of the second transistor being connected to a second terminal of the electronic circuit;
- a base current path for conducting a base current from the base terminal of the first transistor to the base terminal of the second transistor when a voltage at the emitter terminal of the first transistor exceeds the reverse breakdown voltage of the base emitter junction of the first transistor plus the forward turn-on voltage of the base emitter junction of the second transistor;
- a current discharge path for conducting a discharge current from the first terminal to the second terminal through the second transistor when the second transistor is turned on with the base current;
- a first diode in the current discharge path for conducting the discharge current when the second transistor is on; and
- one or more diodes in the base current path or connected to the base current path.

12. The protection circuit according to claim 11, wherein the discharge current flows from the first terminal to the second terminal through the first diode and the second transistor when the voltage at the emitter terminal of the first transistor exceeds the reverse breakdown voltage of the base emitter junction of the first transistor plus a forward turn-on voltage of the base emitter junction of the second transistor plus a sum of turn-on voltages of the one or more diodes.

13. The protection circuit according to claim 11, wherein the anode terminal of the first diode is connected with the first terminal and the cathode terminal of the first diode is connected with the collector terminal of the second transistor.

14. The protection circuit according to claim 11 further comprises a second diode, wherein the cathode terminal of the second diode is connected with the collector terminal of the first transistor and the anode terminal of the second diode is connected with the second terminal.

15. The protection circuit according to claim 11, wherein the collector terminal of the first transistor and the collector terminal of the second transistor are connected.

16. The protection circuit according to claim 11, wherein the first transistor and the second transistor are at least one of an n-p-n type transistor and a p-n-p type transistor.

17. The protection circuit according to claim 14, wherein the first diode is forward-biased and a second diode is reverse-biased when the first transistor and second transistor are n-p-n type transistors, and wherein first diode is reverse-biased and the second diode is forward-biased when the first transistor and second transistor are p-n-p type transistors.

18. An integrated circuit for protecting an electronic circuit from electrostatic discharge (ESD), the integrated circuit comprising:
- a first transistor, the emitter terminal of the first transistor being connected to a first terminal of the electronic circuit;
- a second transistor, the emitter terminal of the second transistor being connected to a second terminal of the electronic circuit, and the base terminal of the second transistor is integrated with the base terminal of the first transistor to form a common base area;
- a first diode, the anode terminal of the first diode being connected to the emitter terminal of the first transistor; and
- a second diode, the anode terminal of the second diode being connected to the emitter terminal of the second transistor and
- the cathode terminal of the second diode, the cathode terminal of the first diode, the collector terminal of the second transistor, and the collector terminal of the first transistor are connected to form a common collector area.

* * * * *